United States Patent [19]

Koyata et al.

[11] Patent Number: 4,781,321
[45] Date of Patent: Nov. 1, 1988

[54] CONTAINER AND METHOD FOR PRODUCING SAME

[76] Inventors: Susumuu Koyata, 29,, Daishoji Sugo-machi Kaga-shi Ishikaw-ken; Hiroyoshi Uchimoto, 6-15, Iesa-machi 3-chome,, Kanazawa shi, Ishikawa-ken, both of Japan

[21] Appl. No.: 86,512

[22] Filed: Aug. 18, 1987

[30] Foreign Application Priority Data

Oct. 28, 1986 [JP] Japan .................................. 61-257558
Mar. 7, 1987 [JP] Japan .................................. 62-52576

[51] Int. Cl.⁴ ............................................... B65D 3/00
[52] U.S. Cl. ............................. 229/1.5 B; 229/2.5 R; 229/4.5; 220/8; 220/414
[58] Field of Search .................. 229/2.5 R, 1.5 B, 4.5, 229/5.8, 101; 206/218; 220/414, 469, 456, 8, DIG. 12; 53/563; 4/619; 131/220; 72/135

[56] References Cited

U.S. PATENT DOCUMENTS

| | | | |
|---|---|---|---|
| 1,284,728 | 11/1918 | Luellen | 229/1.5 B |
| 2,880,902 | 4/1959 | Owsen | 220/8 |
| 3,220,544 | 11/1965 | Lovell | 220/8 |
| 3,285,459 | 11/1966 | Gahm | 206/218 |
| 3,338,474 | 8/1967 | Olson | 220/8 |
| 3,391,617 | 7/1968 | Wise et al. | 229/1.5 B |
| 3,414,180 | 12/1968 | Tigner | 229/1.5 B |
| 3,471,058 | 10/1969 | Latham et al. | 220/8 |
| 3,984,511 | 10/1976 | Lammers | 229/1.5 B |
| 4,660,738 | 4/1987 | Ives | 220/414 |

Primary Examiner—Willis Little
Attorney, Agent, or Firm—Oblon, Fisher, Spivak, McClelland & Maier

[57] ABSTRACT

A container having a base structure formed by coiling an elongated paper strip by the use of an adhesive, and a moisture-proof coating layer covering the surface of the base structure.

2 Claims, 7 Drawing Sheets

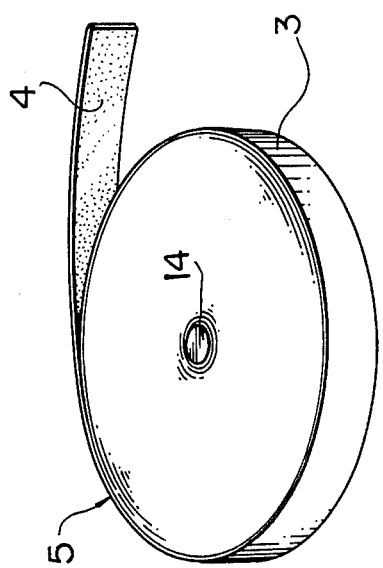
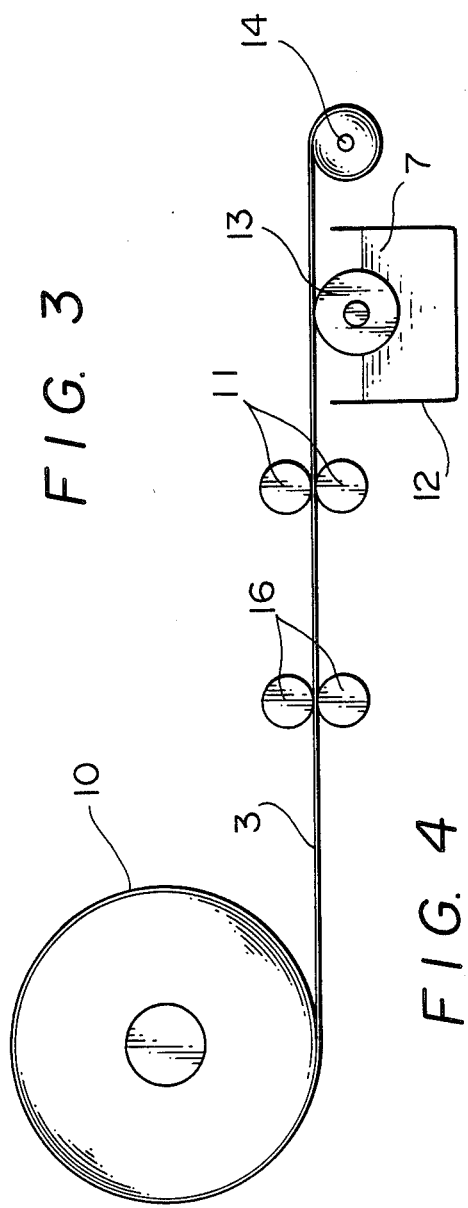
FIG. 3
FIG. 4

CONTAINER AND METHOD FOR PRODUCING SAME

BACKGROUND OF THE INVENTION

1. Field of the Invention

This invention relates to containers having a coating layer on the surface of a papery base structure, suitable for use as tablewares or for decorative purposes, and to a method for producing same.

2. Description of the Prior Art

Containers for use as tablewares or for decoration are made of variety of materials including, in addition to wood, metals such as copper, iron and aluminum and other inorganic materials such as glass and ceramic materials. Wooden containers are largely classified into plain wooden containers exposing unvarnished wood surfaces and coated wooden containers having the wood surfaces covered with a coating.

Because of the features such as lightness and excellent heat retention by heat insulation, wooden containers are extremely useful as tablewares for soup or other watery dishes. Especially lacquer wares with a coating of Japanese lacquer on a shaped wooden base structure have not only a good moisture-proofing property but also excellent decorative effects, in addition to excellent properties in resistance to chemicals, weather durability, heat resistance and sturdiness, so that they are considered valuable not only as articles for practical use but also as decorative articles.

The lacquer wares are generally made by coating a shaped plain wooden structure with a lacquer consisting of Rhus Trichocarpa Mig., Rhus Ambigausa L., Rhus Succedeanea L or the like which is obtained by processing and refining the sap tapped from trees of Rhus genus. The lacquer is coated as it is or after admixing thereto a pigment for coloration, forming a coating of a single layer or plural number of layers on the wooden base structure.

In a case where shaped wood structure is used as a base for a container as described hereinbefore, it is necessary to dry the wood for a long time period after lumbering since cracks easily occur in a coating on insufficiently dried wood during use. Besides, the machining operation for cutting wood into a particular shape depending upon the purpose of use requires a meticulous skill, and the usable part of the lumber is as small as 10%, resulting in a low yield which is reflected by drawbacks such as high cost and infeasibility of mass production in addition to fragility in directions parallel with the wood grains.

Therefore, in order to produce at low cost containers with a coating of high decorative nature like a lacquer coating, it is known to employ a synthetic resin for the container base structure, which is formed into a desired shape by injection molding or the like. However, containers which have a synthetic resin base are inferior in the heat insulating property, with possibilities of softening when hot soup or the like is put in the container. Further, it is necessary to employ expensive molds for shaping the synthetic resin material, which molds are suitable for mass production but not for small-scale production of containers of different types.

OBJECTS OF THE INVENTION

With the foregoing situations in view, the present invention has as its object the provision of a container having a base structure which can be formed into a desired shape in a facilitated manner by the use of an inexpensive material, and a method for producing such a container.

It is another object of the present invention to provide a container having features similar to wooden containers, using a base structure formed of very cheap material like used paper which would otherwise be discarded as waste, and excelling wooden containers in durability, and a method for producing such containers.

It is still another object of the present invention to provide a method for producing containers of the sort mentioned above, forming the containers into a desired threedimensional shape by the use of simple shaping molds.

SUMMARY OF THE INVENTION

In accordance with an aspect of the present invention, the above-mentioned objects are achieved by a method which comprises the steps of: applying an adhesive on one or both faces of an elongated paper strip and wrapping the same around a core to form a paper col of a predetermined shape; extracting the core from the coil and packing and fixing a filler in the core-extracted space by the use of an adhesive to form a base structure of a container; applying an adhesive to form an adhesive layer on the surfaces of the base structure; and forming a moisture-proofing coating on the adhesive layer.

According to another aspect of the present invention, there is provided a method which comprises the steps of: applying an adhesive on one or both faces of an elongated paper strip and wrapping same around a core to form a flat paper coil; extracting the core from the coil and pressing the coil into a desired three-dimensional shape while packing and fixing a filler in the core-extracted space by the use of an adhesive to form a base structure of a container; applying an adhesive to form an adhesive layer on the surface of the base structure; and forming a moisture-proofing coating layer on the adhesive layer.

Features of the container according to the present invention reside in the adhesive layer on the surface of the base structure formed by winding an elongated paper strip which is applied with an adhesive on one or both faces thereof, and the moisture-proofing coating layer laminated on the outer side of the adhesive layer.

BRIEF DESCRIPTION OF THE DRAWINGS

The above and other objects, features and advantages of the invention will become apparent from the following description and the appended claims, taken in conjunction with the accompanying drawings. The drawings show by way of example some preferred embodiments of the invention, which are given for the purpose of illustration only and should not be construed as limitative of the invention.

In the accompanying drawings:

FIGS. 1 through 7 illustrate a first embodiment of the invention, of which;

FIG. 1 is an outer view of a bowl;

FIG. 2 is a sectional view of the bowl;

FIG. 3 is an outer view of a paper coil;

FIG. 4 is a diagrammatic illustration of a line for forming the paper coil;

FIG. 5 is an outer view of shaping molds for forming the base structure of a container;

FIG. 6 is a view similar to FIG. 5 but showing a modification of the shaping die;

FIGS. 7 and 8 are sectional views of base structures for containers of different shapes;

FIGS. 11 and 12 illustrate a second embodiment of the invention, of which;

FIG. 11 is a diagrammatic illustration of a device for forming a body portion of a container;

FIG. 12 is an outer view of the base structure of a container; and

DESCRIPTION OF PREFERRED EMBODIMENTS

Figure 1:
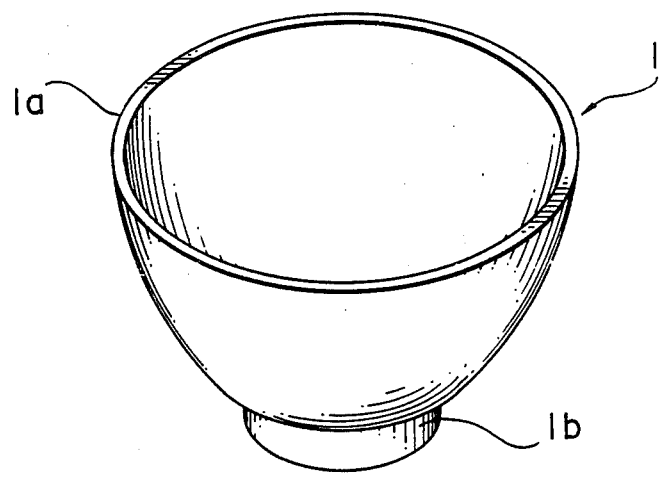
Figure 2:
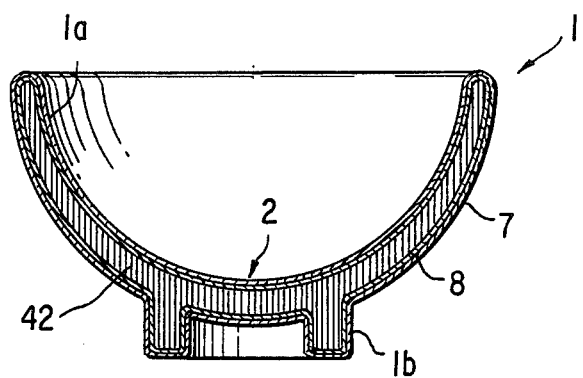

Now, the invention is illustrated more particularly with reference to the drawings, firstly with reference to FIGS. 1 through 7 which show the first embodiment of the invention. In FIGS. 1 and 2, denoted at 1 is a bowl as an example of the container, which bowl 1 consists of a body portion 1a and a support ring 1b which is securely fixed to the bottom side of the body portion 1a. Surfaces of the body portion 1a and the support ring 1b are covered with a coating layer 2.

The body portion 1a of the bowl 1 is formed by continuously winding an elongated paper strip 3 of a predetermined width, which is applied with an adhesive 4 on one or both faces thereof, to form a circular paper coil 5 with predetermined thickness and radius as shown in FIG. 3, forming the coil 5 into a container structure 6 of a concave shape by pushing out peripheral portions of the coil 5, and covering the surfaces of the container structure with the coating layer 2 including a layer of an adhesive 7 and a layer of a moisture-proofing coating 8. In this instance, a strip of paper which has a relatively large thickness and high tensile strength like kraft paper can be suitably used for the afore-mentioned paper strip 3 although the invention is not restricted to any particular kind of paper. For the adhesive 7, there may be employed paste, synthetic resin adhesive, glue or the like.

For forming the coil 5, a paper strip 3 which is wound on a reel 10 is continuously withdrawn from the reel 10 through a feed roller 11 and contacted with an adhesive applicator roll 13 which is rotatably mounted in an adhesive bath 12, as shown in FIG. 4, thereby applying the adhesive 7 on one face of the paper strip 3. The paper strip 3 which has been applied with the adhesive 7 in this manner is wrapped around a core 14 which is put in rotation by a motor or other suitable rotational drive means, forming the circular paper coil 5 of a predetermined radius on the core 14 which is in the form of a cylinder of a small diameter. A tension roller 16 with a friction brake or other tensioning mechanism is provided to uniformalize the tension of the paper layers in the coil 5, winding the coil on the core 14 with desired tightness by adjusting the tension which is imparted by the tensioning mechanism.

Figure 5:
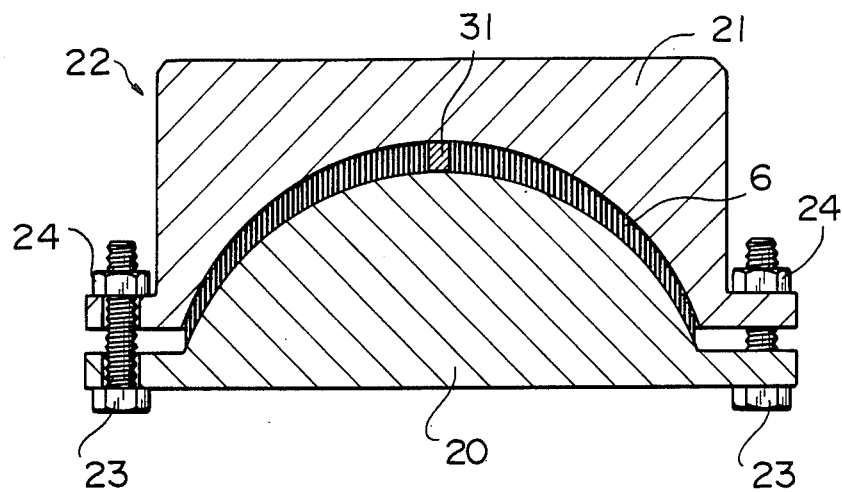

The core 14 is extracted from the coil 5 which has been formed in the above-described manner, and, as shown in FIG. 5, the coreless paper coil 5 is set on a shaper 22 which consists of male and female shaping molds 20 and 21, interposing and pressing the coil 5 between the male and female molds 20 and 21 by fastening the two molds to each other by bolts 23 and nuts 24 to form the container structure 6 of a bowl-like shape. The coil 5 is formed to shape before the adhesive 7 on the surfaces of the paper strip 3 dries up. Thereafter, the adhesive 7 is dried to obtain the shaped container structure 6. By gluing the coiled layers of the paper strip 3 to each other by the adhesive 7, the shape of the container structure 6 is stabilized, free of problems of deformations.

Figure 6:
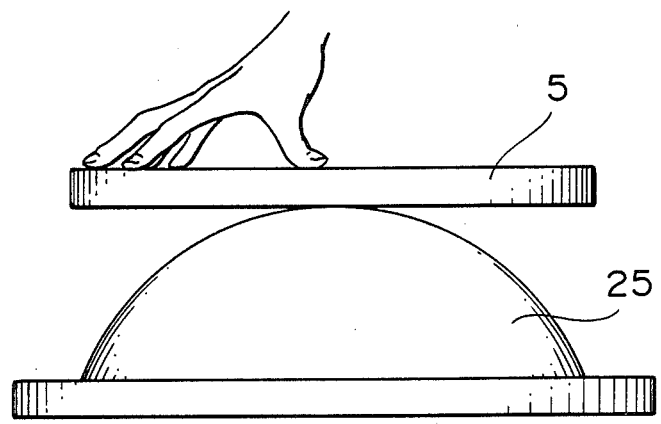
Figure 7:
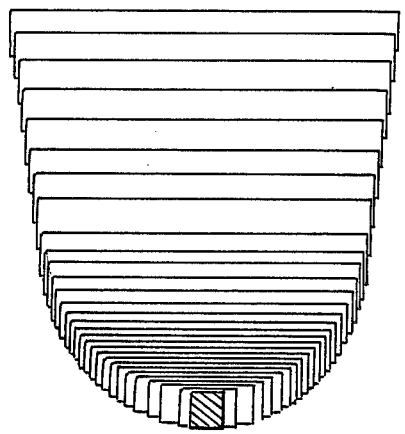
Figure 8:

The male and female mold members 20 and 21 may be cast molds 7 but it is preferred to use gypsum molds 7 since molds of various shapes can be produced easily by the use of gypsum. Besides, gypsum molds which generally have higher moisture absorptivity than cast molds accelerate the drying of the container structure 6, while precluding the possibilities of the paper component of the container structure 6 sticking to the molds. Further, a coil 5 may be shaped by manually pressing the same against a semi-spherical shaping member 25 as shown in FIG. 6 if desired. By preparing the male and female mold members 20 and 21 of a desired shape, it becomes possible to form the paper coil into a container structure of an arbitrary depth, for example, into a shape as shown in FIG. 7. A tray-like container structure as shown in FIG. 8 can be formed by raising only outer peripheral portions of the paper coil 5.

In case the adhesive 7 is of water-soluble type, it can be dried at room temperature. In case of a thermohardening adhesive, it is hardened at a temperature which would not burn or degenerate the paper strip 3. It is also possible to store the coils 5 after drying the adhesive 7 on the paper strips 3, fusing the adhesive 7 by heating the same prior to shaping, and drying it after forming the coils to shape.

Figure 9:
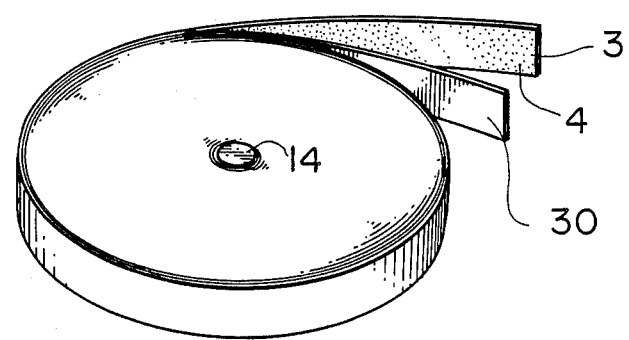
FIG. 9 is an outer view of a modified coil.

In order to impart resiliency to the coil 5, a strip of silk cloth 30 may be interposed and bonded between coiled paper layers as shown in FIG. 9. A metal foil of aluminum or the like may be interposed instead of the silk cloth 30 for the purpose of reinforcing the container structure. In addition, the heat insulating effect of the container structure is increased by the interposition of silk cloth or metal foil between the coiled paper layers. The cloth or metal foil may be inserted either over the entire length or in part of the coil.

As shown in FIG. 5, a filler material 31 such as paper, cork, wood chips or the like is filled in the core-extracted space and bonded to the adjacent coiled paper layers of the container structure 6, which has been formed in the above-described manner, before or after the stage of shaping the coil 5.

Figure 10:
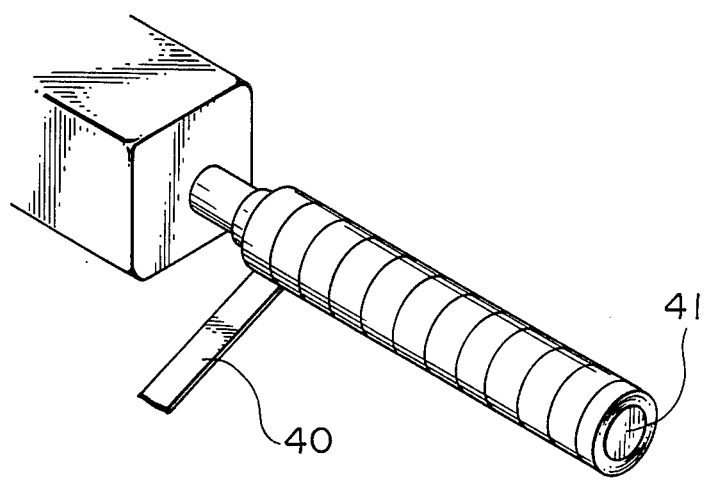
FIG. 10 is a diagrammatic illustration of a device for forming a support ring.

On the other hand, the support rings 1b are formed by wrapping a broad paper strip around a core rod in a tubular or cylindrical form. In this instance, an adhesive is applied to at least one face of the paper strip, which is then wrapped around the core rod in a predetermined thickness while pressing the paper against the core rod by means of a roller or other suitable means. In a case where the broad paper strip is wrapped around the core rod in an overlapping fashion, it is likely that the paper fiber structures may be mostly aligned in certain directions, weakening the structure of the support ring 1b. In order to secure satisfactory strength of the support ring 1b, it is preferred to wrap a broad tape-like paper strip 40 around a core rod 41 in multiple layers which are overlapped one on another in a predetermined degree as shown in FIG. 10. The tubular body which has been formed in this manner is cut into predetermined unit lengths to obtain the support rings 1b. A support ring 1b is securely bonded to the bottom face of each container structure 6 by the use of an adhesive to form a base structure 42 of a container.

The base structure 42 thus formed is finished by sandpapering, thereby smoothening its corner or edge portions or adjusting the shapes of its bottom portions.

Nextly, the adhesive 7 is applied over the entire surfaces of the base structure 42 of the container. By so doing, the entire shape of the base structure 42 is fixed, and the adhesive 7 impregnates into interstices between the coiled paper layers or between a coiled paper layer and a silk cloth or metal foil layer, thereby strengthening the bondages of these components. For high impregnation of the adhesive 7, it is recommended to use a water-soluble adhesive of low viscosity. As long as the coiled paper layers are bonded to each other to a sufficient degree by the adhesive 4, it is possible to increase its thickness by the use of an adhesive of high viscosity for smoothening the stepped surface portions between the coiled paper layers 3. After drying the adhesive 7, the moisture-proofing coating 8 is coated on the adhesive 7. In addition to the afore-mentioned paints, Japanese lacquer or the like is suitably used as the moisture-proofing coating 8. Since the basic structure 42 is formed of paper, the moisture proofing coating 8 can be spread on the base structure 42 in an extremely good condition and can be coated in multiple layers to increase the thickness of the coating for imparting lustre and deepness thereto or for precluding the defects of cracking or defoliation which might occur to the coating layer 2 during use. In addition, the base structure 42 of paper permits the formation of relief or impression easily thereon by providing depressions or projections on the shaper 22 according to a predetermined pattern.

A low temperature sintering ceramic material can also be used as the coating material. For this purpose, ceramic powder which is stirred and dissolved in a suitable solvent such as water is coated by means of a brush or by spraying or dipping, followed by air drying. After repeating this procedure for 3 to 6 times, the container structure is put in an electric oven and heated at about 90° C. for 40 minutes to remove the moisture content in the ceramic, and then sintered at about 120° C. for 1 hour to form a ceramic coating layer on the container structure. In such a case, the heat resistance of the container structure can be enhanced by bonding asbestos or the like on its surfaces to permit sintering of the ceramic coating material at higher temperatures.

By coating such ceramic material, it becomes possible to form ceramic wares having a base structure of paper, which have advantageous properties over the conventional ordinary ceramic wares, e.g. heat retaining effect, lightness, and less susceptibility to rupturing.

As the base structure 42 consists of paper, it becomes possible to obtain the material at an extremely low cost by effectively utilizing waste paper. In addition, there can be obtained containers which present a texture similar to wooden bowls but which have a high heat insulating structure owing to the confined air, exhibiting excellent heat retaining property when used as a tableware. The papery structure with high resiliency is less susceptible to fractures, and can be imparted with higher strength against brittleness by orienting its fibre structures in various directions, in contrast to the wood material shows brittleness in the grain directions.

Figure 11:
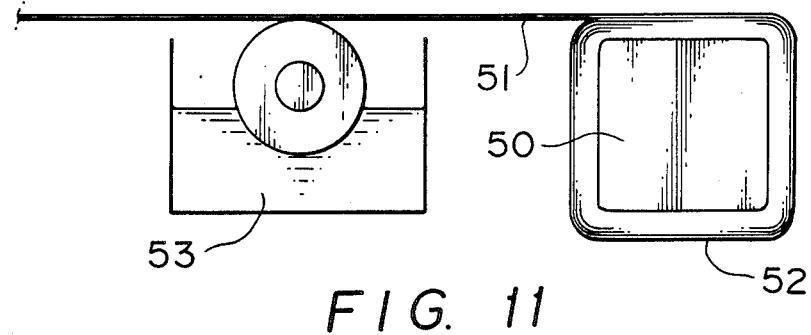
Figure 12:
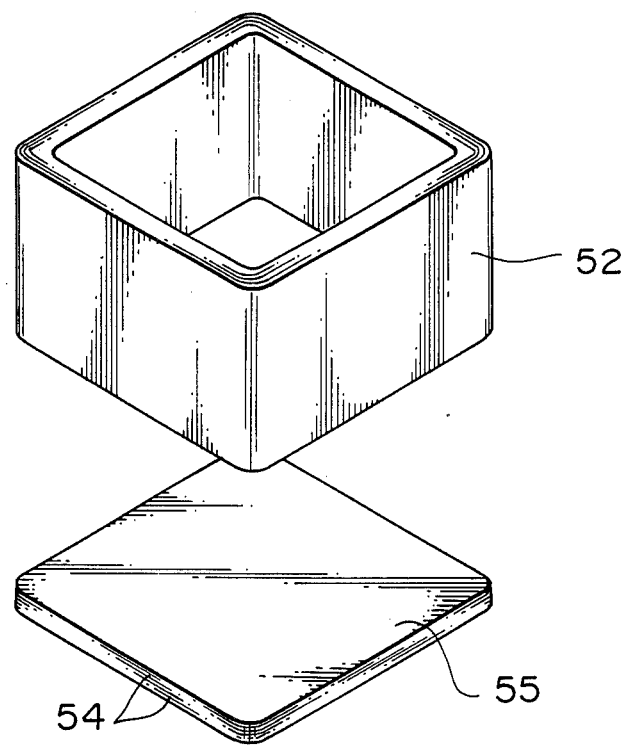

Illustrated in FIGS. 11 and 12 is a second embodiment of the invention, which concerns formation of a box-like container of a predetermined height.

More specifically, as shown in FIG. 11, a paper strip 51 of a width corresponding to the height of the container to be formed is wrapped around a square core 50 to form a body portion 52. Similarly to the above-described first embodiment, the body portion 52 is formed by applying an adhesive 53 on the face of the paper strip to be wound around the core 50. At this time, it is preferred to form the body portion 52 as tightly as possible to omit its shaping in subsequent stages. The shape retainability of the body portion 52 can be enhanced by interposing a metal foil of aluminum or the like between the layers of the coiled paper strip 51.

In the next stage, the core 50 is extracted from the body portion 52 thus formed, and, as shown in FIG. 12, a bottom portion 55 which is formed by laminating paper strips 54 is bonded to an end of the body portion 52, followed by drying to obtain a base structure for a box-like container. An adhesive is applied on the surfaces of the base structure, and then a moisture-proof material is coated thereon to form a box-like container.

Figure 13:
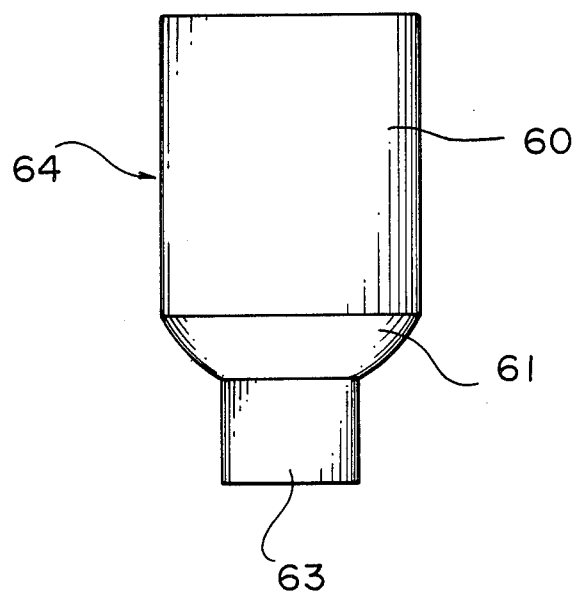
FIG. 13 is an outer view of the base structure of a container in a third embodiment of the invention.

In this instance, a square body portion is formed when a square core is used. Similarly, a body portion of a hexagonal, circular, oval or other desired shape can be formed by the use of a core of the corresponding shape. Further, as shown in FIG. 13, a deep container structure 64 can be formed by connecting a shallow bowl-like structure 61, which is obtained by shaping a coil of elongated tape-like paper strip in the same manner as in the first embodiment, to the bottom end of a circular body portion 60, and bonding a bottom portion 63 with a support ring to the lower side of the bowl-like structure 61.

What is claimed is:

1. A container comprising:
  (a) a base structure composed of coiled paper layers bonded to each other by an adhesive;
  (b) an adhesive layer formed on the surface of said base structure;
  (c) a moisture-proof coating layer laminated on the outer side of said adhesive layer, said moisture-proof coating layer being composed of a paint, Japanese lacquer, or a ceramic material; and
  (d) a cloth or a metal foil interposed between said coiled paper layers.

2. The container of claim 1, wherein a support ring formed by winding a paper strip is securely fixed to the bottom of said base structure.

* * * * *